(12) United States Patent
Simonds

(10) Patent No.: US 6,606,857 B1
(45) Date of Patent: Aug. 19, 2003

(54) FLUID ACTUATED GENERATOR

(75) Inventor: Edward L. Simonds, Adel, IA (US)

(73) Assignee: Thermal Dynamics, Inc., Adel, IA (US)

( * ) Notice: Subject to any disclaimer, the term of this patent is extended or adjusted under 35 U.S.C. 154(b) by 0 days.

(21) Appl. No.: 10/085,928

(22) Filed: Feb. 28, 2002

(51) Int. Cl.$^7$ ............................................... F01B 25/04
(52) U.S. Cl. ........................................... 60/398; 290/54
(58) Field of Search .............................. 60/398; 290/54, 290/53

(56) References Cited

U.S. PATENT DOCUMENTS

| | | | |
|---|---|---|---|
| 1,115,470 A | | 10/1914 | Lipman |
| 1,492,456 A | | 4/1924 | Hansen-Ellehammer |
| 2,636,480 A | | 4/1953 | Becker |
| 2,671,411 A | | 3/1954 | Rhine |
| 3,804,562 A | | 4/1974 | Hansson |
| 3,938,426 A | | 2/1976 | Hunter |
| 3,988,083 A | | 10/1976 | Shimizu et al. |
| 4,142,367 A | * | 3/1979 | Guisti ........................ 60/398 |
| 4,182,123 A | * | 1/1980 | Ueda ........................... 60/398 |
| 4,463,525 A | * | 8/1984 | Sheber ....................... 451/344 |
| 4,475,334 A | * | 10/1984 | Kuwabara ................... 60/398 |
| 4,712,789 A | | 12/1987 | Brilando |
| 4,757,988 A | | 7/1988 | Szymski |
| 4,789,317 A | | 12/1988 | Waser et al. |
| 4,898,524 A | | 2/1990 | Butzen |
| 4,902,001 A | | 2/1990 | Balbo |
| 4,941,771 A | * | 7/1990 | Perper ........................ 405/78 |
| 4,986,402 A | | 1/1991 | Neuwirth |
| 4,998,868 A | | 3/1991 | Sakamaki et al. |
| 5,002,473 A | | 3/1991 | Sakamaki et al. |
| 5,011,390 A | | 4/1991 | Sakamaki et al. |
| 5,030,074 A | | 7/1991 | Sakamaki et al. |
| 5,284,427 A | | 2/1994 | Wacker |
| 5,461,863 A | | 10/1995 | Simonds |
| 5,533,566 A | | 7/1996 | Fineblum |
| 5,551,854 A | | 9/1996 | Edwards |
| 5,617,936 A | | 4/1997 | Nemoto |
| 5,816,789 A | | 10/1998 | Johnson |
| 5,961,310 A | | 10/1999 | McClure |
| 5,967,016 A | | 10/1999 | Simonds |
| 5,974,943 A | | 11/1999 | Simonds |
| 6,024,549 A | | 2/2000 | Lee |
| 6,203,041 B1 | | 3/2001 | Helm |

FOREIGN PATENT DOCUMENTS

| | | | |
|---|---|---|---|
| DE | 2029 280 | 6/1970 | |
| GB | 392999 | 6/1933 | |
| JP | 61-834920 A | 9/1984 | |
| JP | 01-2909240 A | 5/1988 | |
| JP | 2000192441 A | * 7/2000 | ............. E02B/9/00 |
| WO | WO 82/01215 | 4/1982 | |

\* cited by examiner

Primary Examiner—Edward K. Look
Assistant Examiner—Thomas E. Lazo
(74) Attorney, Agent, or Firm—Brett Trout

(57) ABSTRACT

A fluid actuated power assembly for generating power from a pressurized fluid. A tube is provided for siphoning fluid from a body of water to a vane motor. A generator is coupled to the vane motor to produce electricity. The tube is preferably modular and adaptable to a plurality of configurations. This allows the entire assembly to be portable and adaptable to many different types of fluid sources.

12 Claims, 4 Drawing Sheets

FLUID ACTUATED GENERATOR

BACKGROUND OF THE INVENTION

1. Field of the Invention

The present invention relates in general to a fluid generator for converting fluid pressure to work and, more particularly, to a fluid pressure generator for converting fluid pressure to electricity.

2. Description of the Prior Art

Hydroelectric power plants are well known in the art. These plants are typically constructed near a dam. The plants direct water from a lake or retention area behind the dam, across a turbine or other means for converting the fluid pressure into mechanical motion, and thereafter convert this mechanical motion into electricity. One drawback associated with prior art hydroelectric power plants is the time, expense and maintenance associated with their construction. Such plants often cost millions of dollars and take years to construct. Another drawback associated with such prior art hydroelectric plants is their weight and lack of portability. These plants are typically constructed out of concrete, weighing hundreds of thousands of pounds. Due to their size, weight, time of construction and customized nature, they are not portable from one body of water to another. It would, therefore, be desirable to produce a low-cost, lightweight system for converting fluid pressure to work. It would also be desirable to provide such an assembly with means for adapting the assembly to various terrains and bodies of water. It would also be desirable to provide a fluid pressure conversion means which is easily set up and taken down at a desired site. The difficulties encountered in the prior art discussed hereinabove are substantially eliminated by the present invention.

SUMMARY OF THE INVENTION

In an advantage provided by this invention, an inexpensive fluid actuated power generator is provided.

Advantageously, this invention provides an efficient conversion of fluid pressure to work.

Advantageously, this invention provides a lightweight generator for converting fluid pressure to work.

Advantageously, this invention provides a portable fluid actuated power generator.

Advantageously, this invention provides a fluid actuated power generator, adaptable to a plurality of terrains.

Advantageously, this invention provides means for converting fluid pressure into a substantially constant electrical output.

Advantageously, in a preferred example of this invention, a motor is provided, comprising means for directing a fluid from a first body of fluid to a second body of fluid, for converting hydraulic pressure into mechanical motion, having a generator operably coupled to said converting means, and modulating a flow of fluid from said directing means to said converting means.

BRIEF DESCRIPTION OF THE DRAWINGS

The present invention will now be described, by way of example, with reference to the accompanying drawings in which.

DETAILED DESCRIPTION OF THE PREFERRED EMBODIMENT

Figure 1:
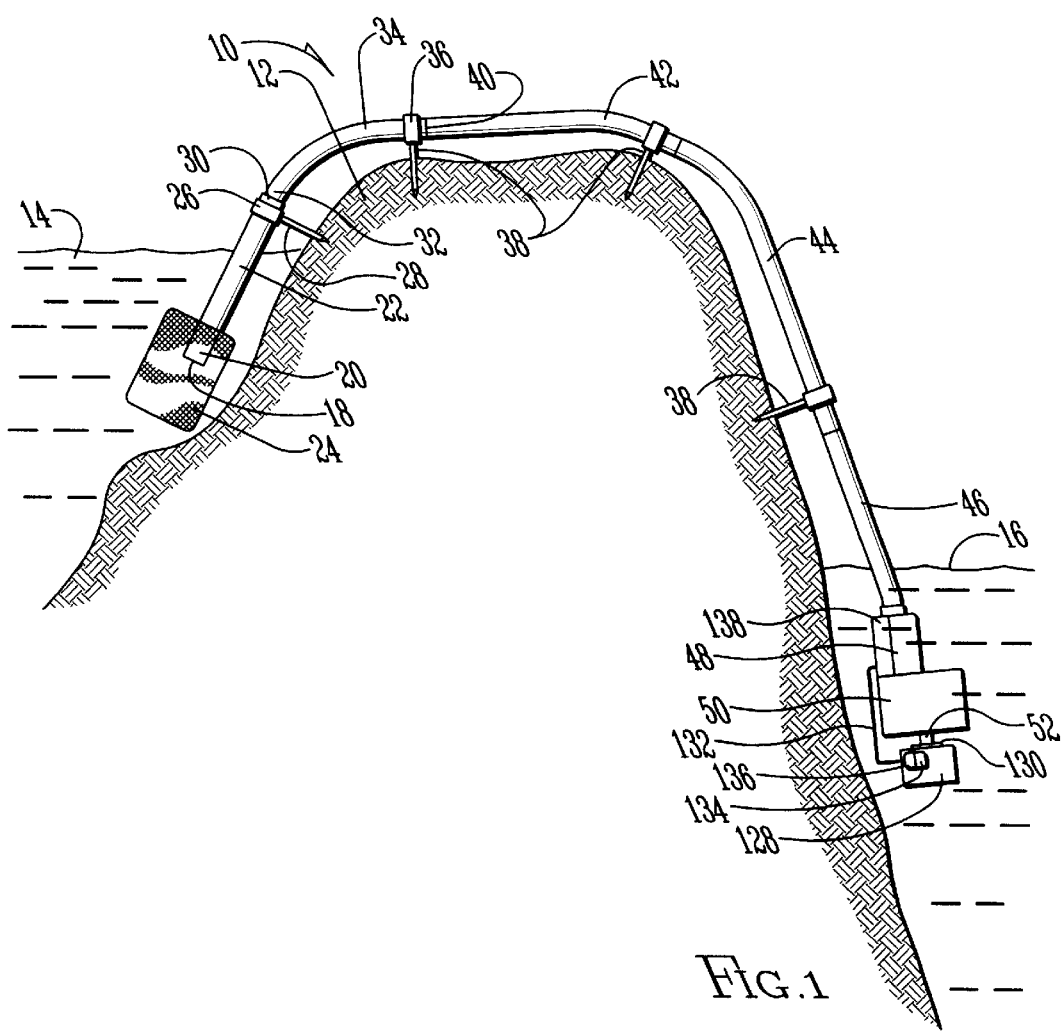
FIG. 1 illustrates a side elevation of the fluid generator of the present invention.

A fluid actuated generator is shown generally as (10) in FIG. 1. As shown in FIG. 1, the generator (10) is provided around a dam (12) retaining a first body of water (14) above a second body of water (16). Although the generator (10) is shown in fluid communication with both bodies of water (14) and (16), the generator (10) may be provided in fluid communication with only the first body of water (14) and drained as desired. As shown in FIG. 1, the generator (10) is provided with an inlet (18) defined by a first end (20) of a first tube (22). The tube (22) is preferably constructed of polyvinyl chloride having a thickness of one centimeter, and a diameter of ten centimeters. Although the first tube (22) may be of any desired dimensions, it is preferably of a diameter between one millimeter and one meter, more preferably, between one centimeter and fifty centimeters, and most preferably, between two centimeters and fifteen centimeters.

As shown in FIG. 1, provided around the first end (20) of the first tube (22) is a cage (24), preferably constructed of steel wire and defining a plurality of inlets of a size sufficient to filter debris from entering the first tube (22). As shown in FIG. 1, the first tube (22) is coupled to the dam (12) by a plastic cuff (26), secured around the first tube (22) and releasably secured to a steel piton (28). Preferably the piton (28) is screwed, hammered, or otherwise coupled into securement with the dam (12). Alternatively, the piton (28) may be a pole coupled to a base for supporting the first tube (22) at a predetermined distance from the dam (12).

As shown in FIG. 1, the first tube (22) is provided with a second end (30), screwed into or otherwise releasably coupled to a first end (32) of a second tube (34). Similarly, the second tube (34) is secured to the dam (12) by a second cuff (36) and piton (38). The second tube (34) is also provided with a second end (40), coupled to a third tube (42). The third tube (42) is coupled to a fourth tube (44), and the fourth tube (44) is coupled to a fifth tube (46) in a manner such as that described above. As shown in FIG. 1, the first tube (22), fourth tube (44) and fifth tube (46) are straight sections, whereas the second tube (34) and third tube (42) are curved sections. By providing a plurality of straight sections and curved sections, and making the providing the tubes (22), (34), (42), (44) and (46) with similar connection means, the tubes (22), (34), (42), (44) and (46) may be assembled in any desired orientation to accommodate any desired curvature of the dam (12) or any other structure.

Similarly, the cuffs (26) and (36), and pitons (28) and (38) may be constructed of any suitable dimensions and connection means to secure the final construction of the tubes (22), (34), (42), (44) and (46) to the dam (12). Alternately, the tubes (22), (34), (42), (44) and (46) may rest directly on the dam (12), or secured in relationship thereto by any other suitable means known in the art. As shown in FIG. 1, the fifth tube (46) is coupled to a variable control valve (48). Although the variable control valve (48) may be of any type known in the art, in the preferred embodiment, the valve (48) is of the needle valve variety, translating rotation of the needle valve into a modulation of fluid flow across the valve. Coupled to the valve (48) is a motor (50). Although the motor (50) is preferably a vane motor, it may be any suitable device for translating fluid pressure into mechanical motion.

Figure 2:
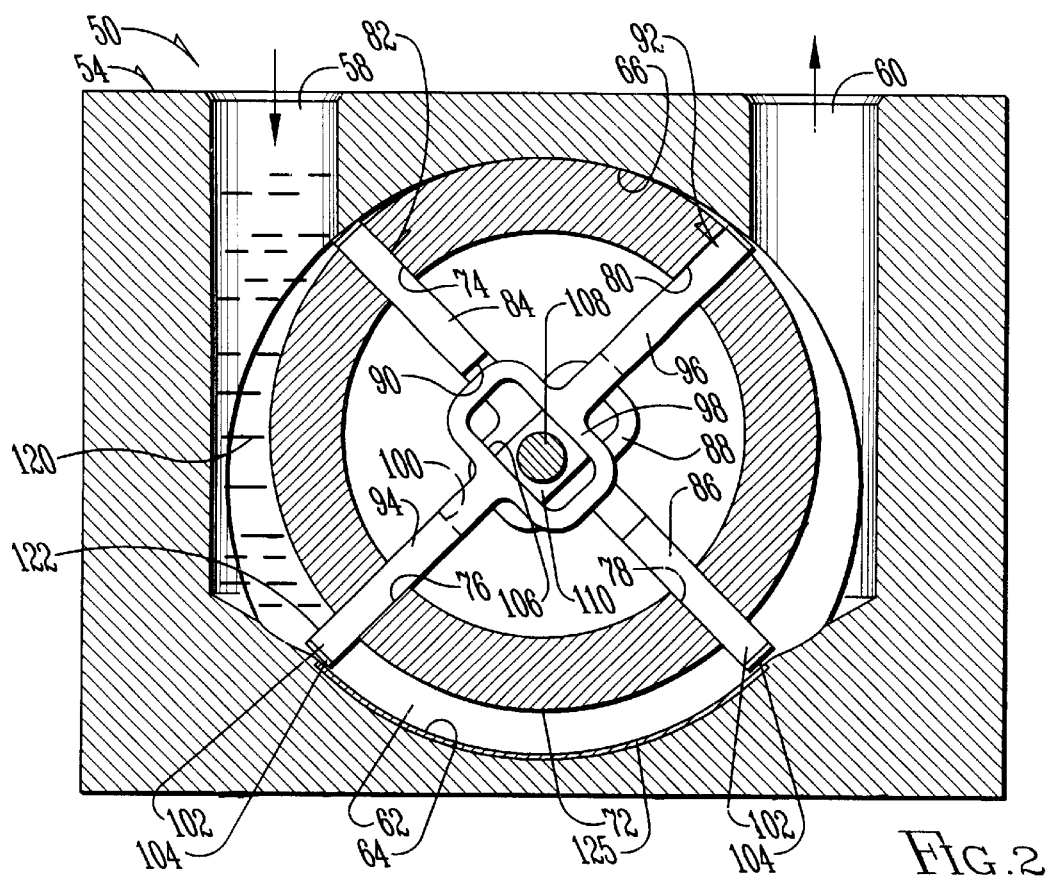
FIG. 2 illustrates a perspective view in cross section of the vane motor of the present invention.
Figure 3:
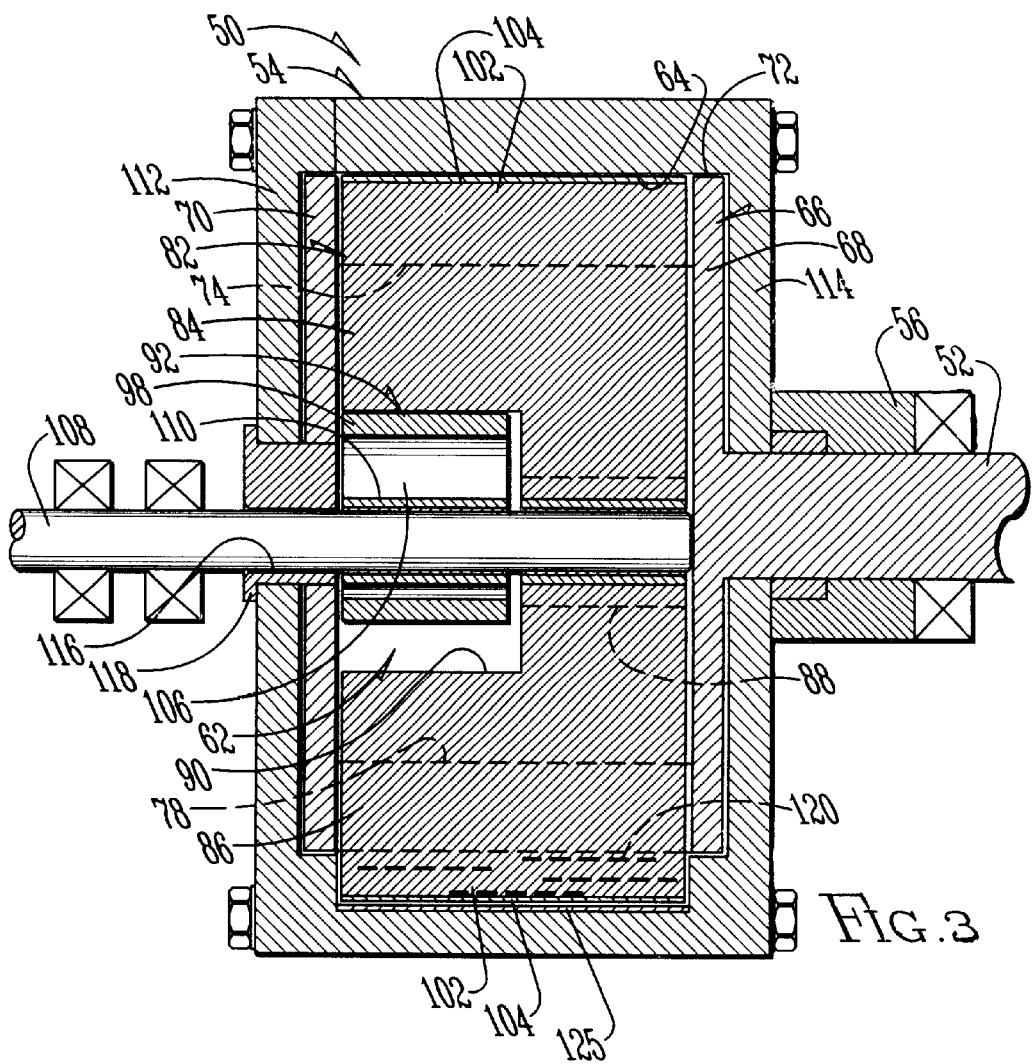
FIG. 3 illustrates a top elevation in cross-section of the vane motor of FIG. 2.

Preferably, as shown in FIGS. 2 and 3, the motor (50) is provided with a drive shaft (52), coupled to a casing (54) by a bushing (56). The casing (54) defines a fluid inlet (58) and a fluid outlet (60). In the preferred embodiment, the fluid inlet (58) is coupled into fluid communication with the valve (48). (FIGS. 1–2). The casing (54) is provided with a hollow interior (62) in fluid communication with the inlet (58) and outlet (60). The hollow interior (62) is defined by an outer race (64). Provided within the hollow interior (62) is an inner drum (66), which comprises a front plate (68), a back plate (70), and a cylindrical inner race (72). (FIGS. 2 and 3). As shown in FIG. 2, the inner race (72) is provided with a first aperture (74), a second aperture (76), a third aperture (78), and a fourth aperture (80).

Provided within the inner drum (66) is a first vane assembly (82), which includes a first vane (84) and a third vane (86), each secured to a lost motion linkage (88). The first vane (84) and third vane (86) are wider than the first lost motion linkage (88), leaving a first C-shaped cutout (90) in the first vane assembly (82). A second vane assembly (92) is also provided, comprising a second vane (94), a fourth vane (96) and a second lost motion linkage (98). The second vane (94) and fourth vane (96) are secured to the second lost motion linkage (98) in a manner similar to that described above to provide a second C-shaped cutout (100).

The first vane assembly (82) and second vane assembly (92) are constructed in a manner which positions the first vane (84) and third vane (86) perpendicular to the second vane (94) and fourth vane (96). The first lost motion linkage (88) is provided within the second C-shaped cutout (100) of the second vane assembly (92), and the second lost motion linkage (98) is provided within the first C-shaped cutout (90) of the first vane assembly (82). Preferably, the vane assemblies (82) and (92) are constructed of stainless steel and are provided near their ends (102) with wear resistant tips (104), constructed of an aluminum nickel bronze alloy, such as those alloys well known in the art to be of superior wear resistance. The tips (104) are rounded with a tighter radius of curvature than the outer race (64). The tips (104) are secured to the vane assemblies (82) and (92) by weldments or similar securement means. The first lost motion linkage (88) defines an interior space (106) with a width approximately one-half of its length. Provided within this interior space (106) is a stainless steel drum shaft (108). Secured around the drum shaft (108) is a guide block (110). The guide block (110) has a square cross-section with a width only slightly smaller than the width of the interior space (106), defined by the first lost motion linkage (88). The guide block (110) is preferably the same depth as the vanes (84), (86), (94) and (96), and extends from the interior space (106) of the first lost motion linkage (88) into an interior space (not shown) defined by the second lost motion linkage (98). This construction allows longitudinal movement of the vane assemblies (82) and (92) relative to the guide block (110) and drum shaft (108), but prevents lateral movement in relationship thereto.

The drum shaft (108) is coupled to a back plate (112) bolted to the casing (54). FIGS. 2 and 3). As shown in FIG. 3, the drum shaft (108) is centered within the hollow interior (62) defined by the outer race (64). The drive shaft (52) is positioned slightly higher than the drum shaft (108), and is coupled to a front plate (114) bolted to the casing (54). The drive shaft (52) is parallel to, but on a different axis than the drum shaft (108). Since the shafts (52) and (108) each rotate on a different axis, the back plate (112) must be provided with a large, circular aperture (116), into which is secured a bearing (118). The bearing (118) supports the inner drum (66) against the casing (54) and allows the drum shaft (108) to extend out of the casing (54) and rotate on its own axis. The bearing (118) also maintains a substantially fluid tight seal to prevent the escape of pressurized fluid out of the casing (54).

As water (120) enters the fluid inlet (58) under pressure, the water presses against a face (122) of the second vane (94), forcing the inner drum (66) into a counterclockwise rotation. (FIG. 2). When the fourth vane (96) is closest to a ceiling (124) of the casing (54), the majority of the fourth vane (96) is located within the inner drum (66). Accordingly, the amount of the fourth vane (96) exposed to the water (120) is reduced, as is its drag coefficient. A larger drag coefficient would allow the water (120) to force the inner drum (66) toward a clockwise rotation, thereby reducing the efficiency of the motor (50).

As the water (120) presses against the face (114) of the second vane (94), the second vane (94) moves along an abrasion plate (125), preferably constructed of titanium or similar abrasion resistant material, preferably being less than five millimeters and, more preferably, less than one millimeter, while being preferably greater than 1/100th of a millimeter and, more preferably, more than 1/50th of a millimeter from the tips (104) of the vanes (84), (86), (94) and (96) as they rotate past. As the second vane (94) rotates toward the end of the abrasion plate (125), the first vane (84) moves toward the abrasion plate (125) and the water (120) presses against a face (126) of the first vane (84), thereby continuing the counterclockwise rotation of the drum shaft (108) and the inner drum (66). As the inner drum (66) continues to rotate, the vanes (84), (86), (94) and (96) extend and retract relative to the inner drum (66). The retraction reduces the drag coefficient of the vanes (84), (86), (94) and (96) when the vanes are near the ceiling (124) to reduce reverse torque on the inner drum (66). Conversely, the extension increases the drag coefficient of the vanes (84), (86), (94) and (96) as the vanes approach the abrasion plate (125) to allow the water (120) to provide maximum forward torque to the inner drum (66) through the vanes (84), (86), (94) and (96). As the vanes (84), (86), (94) and (96) move past the abrasion plate (125), the water (120) exhausts through the fluid outlet (60). Obviously, the motor (50) can be constructed of any desired material of any suitable dimensions.

As shown in FIG. 1, coupled to the drive shaft (52) of the motor (50) is a waterproof electric generator (128). The generator (128) is preferably coupled to the drive shaft (52) via a watertight bushing (130), such as those well known in the art. While the generator (128) is preferably electric, it may, of course, be of any suitable type of power storage or transmission device known in the art, actuated by heat, mechanical, pneumatic or hydraulic power.

As shown in FIG. 1, an electrical cord (132) is coupled to the generator (128) and extends out of the secondary body of water (16) for coupling to batteries (not shown), or any other desired electrical device. Also coupled to the generator (128) is a voltage meter (134) which, in turn, is coupled to a circuit board (136). Preferably, the voltage meter (134) and circuit board (136) are made watertight so as to prevent contact with the water (120). The circuit board (136) is coupled to a motor (138) which, in turn, is operably coupled to the valve (48). The circuit board (136) is designed to monitor the voltage meter (134) and electronically adjust the flow of water (120) through the variable control valve (48), through the use of the motor (138). If the pressure on the water increases, thereby driving the motor (50) faster, and increasing the output of the generator (128), the circuit board signals the motor (138) to close the valve (48) slightly to modulate the electricity produced by the generator (128). Alternatively, if the pressure on the water (120) reduces, the circuit board (136) monitors a voltage drop from the voltage meter (134) and signals the motor (138) to open the valve (48) slightly to increase the flow of water (120) through the valve (48), thereby driving the motor (50) more quickly and causing the generator (128) to produce more electricity.

Figure 4:
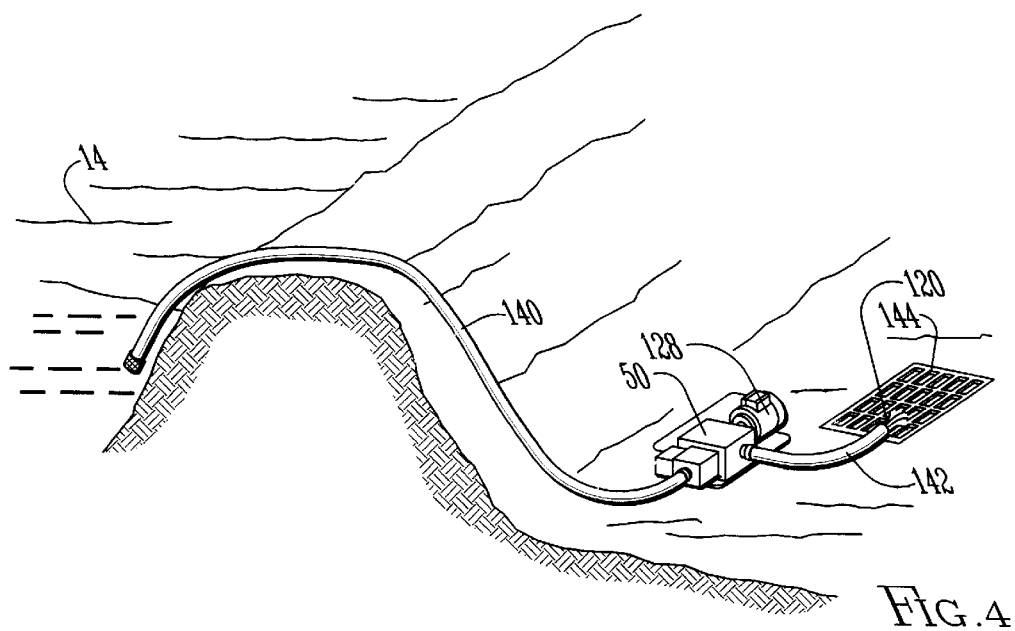
FIG. 4 illustrates an alternative embodiment of the present invention, utilizing a flexible fluid delivery tube.
Figure 5:
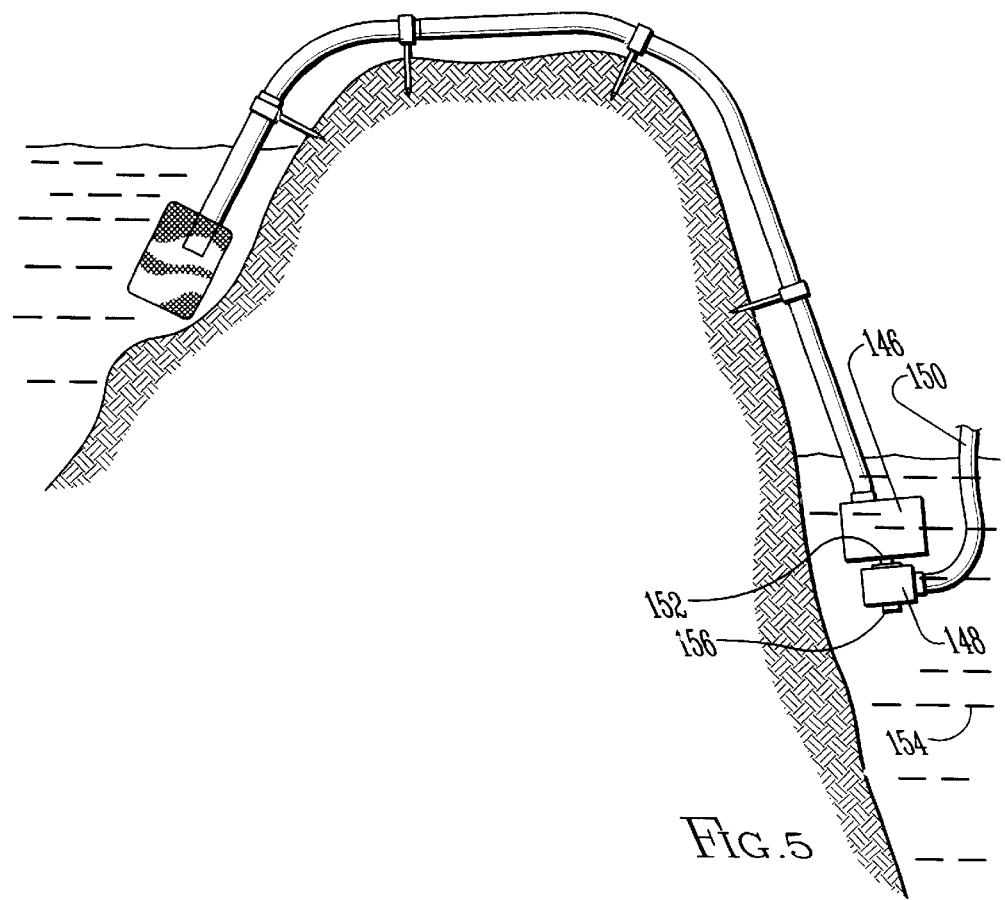
FIG. 5 illustrates an alternative embodiment of the present invention, utilizing a vane motor coupled to a vane pump-to-pump fluid.

An alternative embodiment of the present invention is shown in FIG. 4, which utilizes a flexible hose, such as a garden hose or braided pressurized fluid hose to draw water from the body of water (14) and run the generator (128). As shown in FIG. 4, a second hose (142) is coupled to the motor (50) and run into a storm sewer (144), or similar depository if there is no second body of water available. In this embodiment, the flexible hose (140) may either be secured to the ground using stakes or brackets (not shown), or may simply laid along the ground and later coiled for transport. Still another embodiment of this present invention is detailed in FIG. 5, wherein a first motor (146) is coupled to a second motor (148), which, in turn, is coupled to an outlet hose (150). In this embodiment, the first motor (146) acts as a driving means to turn 49 the shaft (152). The shaft (152) is coupled to the second motor (148), which, in this embodiment, acts as a pump, driven by the shaft (152), and drawing water (154) through an inlet (156), and forcing the water (154) through the hose (150), where it may be used to irrigate crops, fill wells, or for any other desired purpose.

An advantage provided in all of the foregoing embodiments is that the fluid actuated generator (10) may be readily disassembled with a minimum of tools, transported in a vehicle, and reconfigured at an alternate site. Preferably, the components are designed for assembly by hand, without tools, in the field. Preferably, all of the components of the fluid actuated generator (10) comprise an area less than three square meters and, more preferably,. an area less than one square meter. Similarly, all of the components of the generator preferably collectively weigh less than five hundred kilograms and, more preferably, less than fifty kilograms. In the most preferred embodiment of the present invention, a single individual will be able to take down the fluid actuated generator (10) in a manner of minutes, carry the components to a vehicle (not shown), transport the components in that vehicle, and set up the fluid actuated generator (10) in an alternate location quickly and efficiently.

Although the invention has been described with respect to a preferred embodiment thereof, it is also to be understood that it is not to be so limited, since changes and modifications can be made therein which are within the full intended scope of this invention as defined by the appended claims. For example, it should be noted that any desired motor (50) may be used, including a standard turbine or vane motor, and that any type of generator, including both direct current and alternating current generators, may be utilized in accordance with the present invention.

What is claimed is:

1. A fluid actuated power assembly comprising:
   (a) means for directing a fluid from a first body of fluid;
   (b) means for adapting said directing means into a plurality of configurations;
   (c) means coupled into fluid communication with said directing means for converting fluid pressure into mechanical motion;
   (d) a generator operably coupled to said converting means;
   (e) means coupled to said directing means and to said converting means for modulating a flow of fluid from said directing means to said converting means; and
   (f) means coupled to said directing means for releasably securing said directing means against movement.

2. The fluid actuated power assembly of claim 1, wherein said securing means comprises releasably securing to the ground and second means for releasably securing to said directing means.

3. The fluid actuated power assembly of claim 2, wherein said first securing means is a shaft and wherein said second securing means is arcuate.

4. A fluid actuated power assembly comprising:
   (a) means for directing a fluid from a first body of fluid;
   (b) means for adapting said directing means into a plurality of configurations;
   (c) means coupled into fluid communication with said directing means for converting fluid pressure into mechanical motion;
   (d) a generator operably coupled to said converting means;
   (e) means coupled to said directing means and to said converting means for modulating a flow of fluid from said directing means to said converting means; and
   (f) means provided around said generator for substantially preventing fluid from contacting said generator.

5. A fluid actuated power assembly comprising:
   (a) means for directing a fluid from a first body of fluid;
   (b) means for adapting said directing means into a plurality of configurations;
   (c) means coupled into fluid communication with said directing means for converting fluid pressure into mechanical motion;
   (d) a generator operably coupled to said converting means;
   (e) means coupled to said directing means and to said converting means for modulating a flow of fluid from said directing means to said converting means; and
   (f) wherein said directing means, said converting means, said generator and said modulating means collectively weigh less than one hundred kilograms.

6. The fluid actuated power assembly of claim 5, wherein said directing means, said converting means, said generating means and said modulating means collectively weigh less than fifty kilograms.

7. A fluid actuated power assembly comprising:
   (a) a first tube having a first end and a second end;
   (b) a second tube having a first end and a second end;
   (c) means for releasably coupling said second end of said first tube into substantially fluid tight, fluid engagement with said fist end of said first tube;
   (d) a plurality of vanes coupled in fluid communication with said second end of said tube; and
   (e) a substantially waterproof generator coupled to said plurality of vanes.

8. A fluid actuated power assembly comprising:
   (a) a first tube having a fist end and a second end;
   (b) a second tube having a first end and a second end;
   (c) means for releasably coupling said second end of said first tube into substantially fluid tight, fluid engagement with said first end of said first tube;

(d) a first plurality of vanes coupled in fluid communication with said second end of said tube; and (e) a second plurality of vanes coupled to said first plurality of vanes.

9. The fluid actuated power assembly of claim 8, further comprising means couple to said second plurality of vanes for pumping fluid from said second plurality of vanes to a predetermined location.

10. A fluid actuated power assembly comprising:

(a) a flexible tube;

(b) a fluid control valve coupled to said flexible tube;

(c) a plurality of vanes coupled to said fluid control valve; and (d) an electrical generator coupled to said plurality of vanes.

11. The fluid actuated power assembly of claim 10, further comprising means coupled to said fluid control valve and to said generator for adjusting said fluid control valve in response to an output from said generator.

12. The fluid actuated power assembly of claim 10, further comprising:

(a) an outer race centered about a first axis;

(b) an inner race centered about a second axis;

(c) wherein said first axis is different from said second axis;

(d) wherein said first axis is parallel to said second axis; and (e) wherein said plurality of vanes is coupled for movement relative to said inner race.

* * * * *